United States Patent [19]

Jirgal

[11] Patent Number: 5,715,467
[45] Date of Patent: Feb. 3, 1998

[54] EVENT DRIVEN POWER MANAGEMENT CONTROL CIRCUIT AND METHOD THEREFOR

[75] Inventor: James J. Jirgal, Chandler, Ariz.

[73] Assignee: VLSI Technology, Inc., San Jose, Calif.

[21] Appl. No.: 627,461

[22] Filed: Apr. 4, 1996

[51] Int. Cl.⁶ ............................................ G06F 1/32
[52] U.S. Cl. ........................ 395/750.01; 395/750.04; 395/750.08
[58] Field of Search ........................... 395/750, 550, 395/750.01, 750.04, 750.08

[56] References Cited

U.S. PATENT DOCUMENTS

| | | | |
|---|---|---|---|
| 5,369,771 | 11/1994 | Gettel | 395/750 |
| 5,513,361 | 4/1996 | Young | 395/750 |
| 5,546,568 | 8/1996 | Bland et al. | 395/550 |
| 5,546,591 | 8/1996 | Wurzburg et al. | 395/750 |
| 5,553,236 | 9/1996 | Revilla et al. | 395/183.01 |
| 5,564,015 | 10/1996 | Bunnell | 395/750 |

*Primary Examiner*—Jack B. Harvey
*Assistant Examiner*—Ario Etienne
*Attorney, Agent, or Firm*—Harry M. Weiss; Jeffrey D. Moy; Harry M. Weiss & Associates, P.C.

[57] ABSTRACT

An event driven power management control system. The event driven power management control system is compatible with existing CPU power management control units which only monitor CPU activity. The event driven power management control system is able to modify a STPCLK# signal asserted by the CPU power management control unit if external or internal events in the computer system require the CPU to run at full speed in order to service the break event.

11 Claims, 1 Drawing Sheet

EVENT DRIVEN POWER MANAGEMENT CONTROL CIRCUIT AND METHOD THEREFOR

BACKGROUND OF THE INVENTION

1. Field of the Invention

This invention relates to computer systems and, more specifically, to an event driven power management control system which can speed up or slow down the internal clock of the Central Processing Unit (CPU) based on activity of the computer system and which is compatible with third party power management control circuits which only monitor CPU activity.

2. Description of the Prior Art

In the past, in order to reduce power consumption of a computer system, power management circuitry was designed to monitor CPU activity. During times of CPU inactivity, the power management circuitry would assert a STPCLK# low signal to the CPU causing the internal clock of the CPU to be deactivated. When CPU activity resumed, the power management circuitry would assert a STPCLK# high signal to restart the internal clock of the CPU.

The problem with these types of power management systems is that they are one dimensional. These types of power management systems only activate and deactivate the internal clock of the CPU based on CPU activity. These systems do not monitor the activity of peripheral devices which may be coupled to the computer system nor are they compatible with other types of power management systems which may shut down or restore power to the peripheral devices based on the activity of the peripheral devices.

Therefore, a need existed to provide an improved power management control system. The improved power management control system must account for existing power management control systems which may shut down or restore power to peripheral devices based on activity of the peripheral devices, speed up or slow down the CPU or SUSPEND the computer system. The improved power management control system must also support existing power management control systems which only alter the clock signal to the CPU based on CPU activity, but which is also capable of being able to override the signal to deactivate the CPU clock if any external or internal system events require the CPU to run at full speed to service the event request.

SUMMARY OF THE INVENTION

In accordance with one embodiment of the present invention, it is an object of the present invention to provide an improved power management control system that is compatible with existing power management control systems which may shut down or restore power to peripheral devices based on activity of the peripheral devices, speed up or slow down the internal clock of the CPU, SUSPEND the computer system, or perform other power management duties.

It is another object of the present invention to provide an improved power management control system that supports existing power management control systems which only alter the clock signal to the CPU based on CPU activity, but which is also capable of overriding a signal to deactivate the CPU clock if any external or internal system events require the CPU to run at full speed to service the event request.

BRIEF DESCRIPTION OF THE PREFERRED EMBODIMENTS

In accordance with one embodiment of the present invention, an event driven power management control circuit for a computer system is disclosed. The event driven power management control circuit is comprised of a Central Processing Unit (CPU) means for controlling operation of the computer system. CPU power management control means are coupled to the CPU means for sending a signal to the CPU means to activate and deactivate an internal clock of the CPU means based on activity of the CPU means. System power management control means having an input coupled to the CPU power management control means and an output coupled to the CPU means are provided for monitoring internal and external events of the computer system and for modifying the signal from the CPU power management control means based on activity of the computer system. The system power management control means is comprised of stop clock logic means for modifying the signal from the CPU power management control means based on activity of the computer system. Sampler means are coupled to the stop clock logic means for sampling the signal from the CPU power management control means and for relaying the signal to the stop clock logic means. Timer means are coupled to the sampler means for signalling the sampler means when to sample the signal from the CPU power management control means.

In accordance with another embodiment of the present invention, a method for providing an event driven power management control circuit for a computer system is disclosed. The method is comprised of the steps of: providing CPU means for controlling operation of the computer system; providing CPU power management control means having an output coupled to the CPU means for sending a signal to the CPU means to activate and deactivate an internal clock of the CPU means based on activity of the CPU means; and providing system power management control means having an input coupled to the CPU power management control means and an output coupled to the CPU means for modifying the signal from the CPU power management control means based on activity of the computer system. The step of providing system power management control means further comprises the steps of: providing stop clock logic means having means for monitoring external and internal events of the computer system and for modifying the signal from the system power management control means based on the external and internal events; providing sampler means coupled to the stop clock logic means for sampling the signal from the CPU power management control means and for relaying the signal to the stop clock logic means; and providing timer means coupled to the sampler means for signalling the sampler means when to sample the signal from the CPU power management control means.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
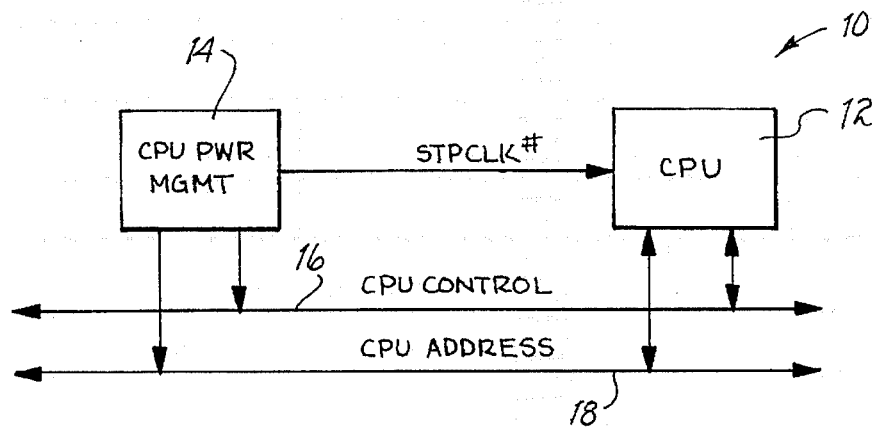
FIG. 1 is a simplified functional block diagram of a prior art CPU power management control circuit.

Referring to FIG. 1, a prior art Central Processing Unit (CPU) power management system 10 (hereinafter system 10) is shown. The system 10 is comprised of a CPU 12 and a CPU power management unit 14. The CPU power management unit 14 is coupled directly to the CPU control bus 16 and to the CPU address bus 18. The CPU power management unit 14 monitors the activity of the busses 16 and 18 to control an internal clock of the CPU 12. When the CPU power management unit 14 monitors inactivity on the busses 16 and 18, the CPU power management unit 14 asserts a STPCLK# signal low to the CPU 12 in order to deactivate the internal clock of the CPU 12. The CPU power management unit 14 would assert a STPCLK# signal high to the CPU 12 in order to start the internal clock of the CPU 12 when activity is monitored on the busses 16 and 18.

The problem with the CPU power management unit 14 is that it only starts and stops the internal clock of the CPU 12 based on its own inputs. Furthermore, the CPU power management unit 14 does not account for other power management circuitry that the computer system might be using. For example, VLSI TECHNOLOGY, INC. has developed a power management unit which monitors activity to peripheral devices in the computer system such as the hard disk, keyboard controller, printer, etc. Accesses to these peripheral devices, as well as other peripheral devices and other system events, trigger the VLSI TECHNOLOGY, INC. power management unit to shut down or restore power to the peripheral devices, speed up or slow down the CPU clock, SUSPEND the computer system, or perform any number of other power management activities.

Figure 2:
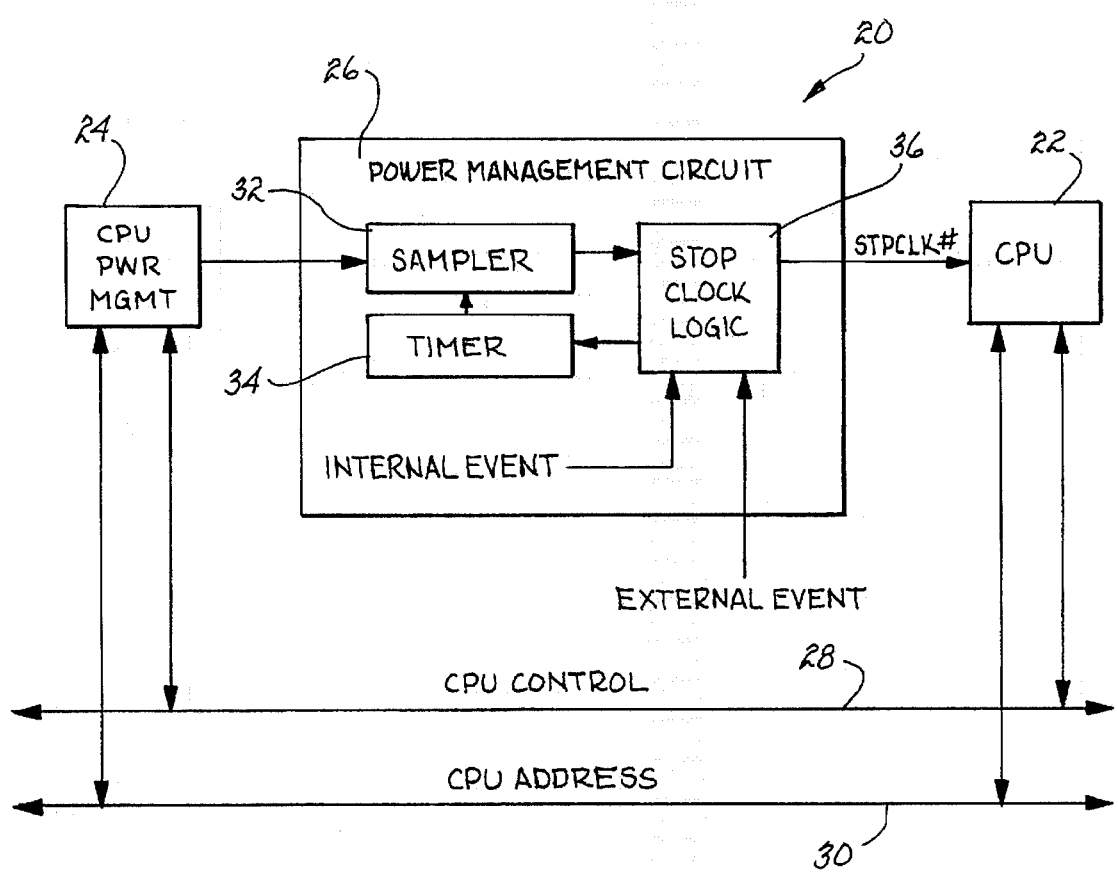
FIG. 2 is a simplified functional block diagram of an event driven power management control circuit of the present invention.

Referring to FIG. 2, an event driven power management control system 20 (hereinafter system 20) is shown. The system 20 is compatible with the prior art system 10 (FIG. 1) in that the system 20 is able to assert and deassert the STPCLK# signal to the CPU 22 whenever the system 10 (FIG. 1) would have asserted or deasserted the STPCLK# signal. The system 20 is also able to account for other power management systems such as the VLSI TECHNOLOGY, INC. power management unit discussed above in that it is able to control system activity by monitoring external and internal events in the computer system.

The system 20 is comprised of a CPU 22, a CPU power management unit 24, and a system power management unit 26. Like the prior art system 10 (FIG. 1), the CPU power management unit 24 is directly coupled to the CPU control bus 28 and to the CPU address bus 30. The CPU power management unit 24 monitors activity on the busses 28 and 30 and asserts or deasserts the STPCLK# signal in response to activity of the busses 28 and 30.

The CPU power management unit 24 is coupled to the system power management unit 26. When the CPU power management unit 24 asserts or deasserts the STPCLK# signal, this signal is sent directly to the system power management unit 26. The system power management unit 26 modifies the STPCLK# signal from the CPU power management unit 24 based on internal and external events occurring in the computer system. The modified STPCLK# signal is then sent to the internal clock of the CPU 22 so that the CPU 22 can control the operation of the computer system.

The system power management unit 26 is comprised of a sampler 32, a timer 34, and stop clock logic 36. The sampler 32 is coupled to the CPU power management unit 24. The sampler 32 samples the STPCLK# signal from the CPU power management unit 24 and relays the signal to the stop clock logic 36. The stop clock logic 36 will modify the inputted signal based on internal events (i.e., timer alarms, clock control circuitry to modulate system speed or temperature, etc.) and external events (i.e., interrupts, keyboard strokes, mouse movement, modem ring, etc.) occurring in the computer system. For example, the CPU power management unit 24 may assert the STPCLK# signal due to CPU inactivity. The sampler 32 will read and sample the STPCLK# signal and relay the signal to the stop clock logic 36. If the stop clock logic 36 monitors any internal or external events (i.e., break events), the stop clock logic 36 will modify the STPCLK# signal relayed from the sampler 32 so as to deassert the STPCLK# signal to the CPU 22. Thus, the CPU 22 is allowed to run at full speed so as to service the source of the break event even though the CPU power management unit 24 indicates no CPU activity.

Once a break event occurs, the CPU power management unit 24 may still interpret the computer system as being idle since the CPU power management unit 24 only monitors for CPU activity on the CPU control bus 28 and the CPU address bus 30. A timer 34 was thus added in order to delay sampling of the STPCLK# signal from the CPU power management unit 24. The timer 34 delays the sampling of the STPCLK# signal in order to give the CPU power management unit 24 time to react to the changed state of the computer system. Thus, the timer 34 helps to prevent a false entry into a CPU stopped clock state. In the preferred embodiment of the present invention, the length of time programmed for the timer is enough to satisfy the longest time requirement of the break event servicing routines.

While the invention has been particularly shown and described with reference to a preferred embodiment thereof, it should be understood by those skilled in the art that changes in form and detail may be made therein without departing from the spirit and scope of the invention.

I claim:

1. An event driven power management control circuit for a computer system comprising, in combination:

Central Processing Unit (CPU) means for controlling operation of said computer system;

CPU power management control means having an output coupled to said CPU means for sending a stop clock (STPCLK#) signal to said CPU means to activate and deactivate an internal clock of said CPU means based on activity of said CPU means; and system power management control means having an input coupled to said CPU power management control means and an output coupled to said CPU means for sampling said STPCLK# signal at timed intervals and for modifying said STPCLK# signal from said CPU power management control means based on activity of said computer system.

2. An event driven power management control circuit in accordance with claim 1 wherein said system power management control means comprises:

stop clock logic means for modifying said signal from said CPU power management control means based on activity of said computer system;

sampler means coupled to said stop clock logic means for sampling said signal from said CPU power management control means and for relaying said signal to said stop clock logic means; and timer means coupled to said sampler means for signalling said sampler means when to sample said signal from said CPU power management control means.

3. An event driven power management control circuit in accordance with claim 2 wherein said stop clock logic means further comprises means for monitoring external and internal events of said computer system for said stop clock logic means to modify said signal from said CPU power management control means based on said external events and said internal events.

4. An event driven power management control circuit in accordance with claim 1 wherein said CPU power management control means monitors a CPU control bus and a CPU address bus for activity of said CPU.

5. An event driven power management control circuit in accordance with claim 2 wherein said timer means is programmed with a time length approximately equal to a longest time requirement of a break event service routine.

6. An event driven power management control circuit for a computer system comprising, in combination:

Central Processing Unit (CPU) means for controlling operation of said computer system;

CPU power management control means having an output coupled to said CPU means for sending a signal to said CPU means to activate and deactivate an internal clock of said CPU means based on activity of said CPU means; and system power management control means having an input coupled to said CPU power management control means and an output coupled to said CPU means for modifying said signal from said CPU power management control means based on activity of said computer system, said system power management means comprising:

stop clock logic means for monitoring external and internal events of said computer system and for modifying said signal from said CPU power management control means based on said external and internal events of said computer system;

sampler means coupled to said stop clock logic means for sampling said signal from said CPU power management and for re means and for relaying said signal to said stop clock logic means; and timer means coupled to said sampler means for signalling said sampler means when to sample said signal from said CPU power management control means, said timer means being programmed with a time length approximately equal to a longest time requirement of a break event service routine.

7. A method for providing an event driven power management control circuit for a computer system comprising the steps of:

providing Central Processing Unit (CPU) means for controlling operation of said computer system;

providing CPU power management control means having an output coupled to said CPU means for sending a stop clock (STPCLK#) signal to said CPU means to activate and deactivate an internal clock of said CPU means based on activity of said CPU means; and providing system power management control means having an input coupled to said CPU power management control means and an output coupled to said CPU means for sampling said STPCLK# signal at timed intervals and for modifying said STPCLK# signal from said CPU power management control means based on activity of said computer system.

8. The method of claim 7 wherein said step of providing system power management control means further comprises the steps of:

providing stop clock logic means for modifying said signal from said CPU power management control means based on activity of said computer system;

providing sampler means coupled to said stop clock logic means for sampling said signal from said CPU power management control means and for relaying said signal to said stop clock logic means; and providing timer means coupled to said sampler means for signalling said sampler means when to sample said signal from said CPU power management control means.

9. The method of claim 8 wherein said step of providing stop clock logic means further comprises the step of providing stop clock logic means having means for monitoring external and internal events of said computer system for said stop clock logic means to modify said signal from said system power management control means based on said external and internal events.

10. The method claim 7 wherein said step of providing CPU power management control means further comprises the step of coupling said CPU power management means to a CPU control bus and a CPU address bus to monitor activity of said CPU.

11. The method of claim 8 wherein said step of providing timer means further comprises the step of programming said timer means with a time length approximately equal to a longest time requirement of a break event service routine.

\* \* \* \* \*